United States Patent [19]
DiGiovanni et al.

[11] Patent Number: 5,115,338
[45] Date of Patent: May 19, 1992

[54] MULTI-STAGE OPTICAL AMPLIFIER

[75] Inventors: David J. DiGiovanni, Scotch Plains; Clinton R. Giles, Holmdel, both of N.J.

[73] Assignee: AT&T Bell Laboratories, Murray Hill, N.J.

[21] Appl. No.: 686,013

[22] Filed: Apr. 12, 1991

Related U.S. Application Data

[63] Continuation of Ser. No. 530,665, May 30, 1990, abandoned.

[51] Int. Cl.⁵ .......................... G02B 6/26; H01L 15/00
[52] U.S. Cl. ..................... 359/337; 359/341; 385/24; 372/6
[58] Field of Search .............. 359/337, 341; 385/24

[56] References Cited

U.S. PATENT DOCUMENTS

| | | | |
|---|---|---|---|
| 3,416,089 | 12/1968 | Koester et al. | 359/337 |
| 3,599,106 | 8/1971 | Snitzer | 330/4.3 |
| 3,949,315 | 4/1976 | Zeidler | 372/6 |
| 4,015,217 | 3/1977 | Snitzer | 330/4.3 |
| 4,143,332 | 3/1979 | Michan et al. | 330/4.3 |
| 4,859,016 | 8/1989 | Shaw et al. | 350/96.15 |
| 4,906,949 | 3/1990 | Pocholle et al. | 330/4.3 |
| 4,938,556 | 7/1990 | Digonnet et al. | 350/96.15 |

OTHER PUBLICATIONS

Electronics Letters, May 10, 1990, vol. 26, No. 10, pp. 661–662.
Olsson et al.: "Two-Stage High-Gain Optical Amplifier"; Journ. Lightwave Tech., vol 7, #5, May 1989, pp. 791–793.
Mesuda et al; "High Gain Two Stage Amplification . . . "; Elect. Lett., vol. 26, #10, pp. 661–662, May 1, 1990.
Giles et al; "2 GBit/ Signal Amplification . . . Amplifier"; J. Lightwave Tech., vol. 7, #4, pp. 651–656, May 1989, Abstract Supplied.
Giles et al; "Noise Performance of Erbium-Doped . . . "; IBEB Photonics. Tech. Lett.; vol. 1, #11, pp. 367–369, Nov. 1989, Abstract Supplied.

Primary Examiner—Nelson Moskowitz
Attorney, Agent, or Firm—Eli Weiss

[57] ABSTRACT

This invention relates to an Erbium-doped fiber amplifier having multiple stages of amplification for providing enhanced performance. More specifically, optical means is located intermediate first and second stages of doped optical amplifying fibers adapted to receive a pump signal at a pump wavelength where the optical means is adapted to modify the net gain characteristics of the multi-stage amplifier. Presently, all known Erbium-doped fiber amplifiers utilize relatively simple single stage amplifiers which support required ancillary optically passive components such as isolators, filters, pump multiplexers, power monitors and the like at either end of the amplifier. This requirement of having the passive optical element at an end of thhe optical amplifier not only lends to relatively stringent design and fabrication tolerances for a high performance optical amplifier, but it restricts the design of the Erbium-doped fiber amplifier to an embodiment which prevents exploitation of the various unique properties of the Erbium-doped fiber amplifier.

2 Claims, 2 Drawing Sheets

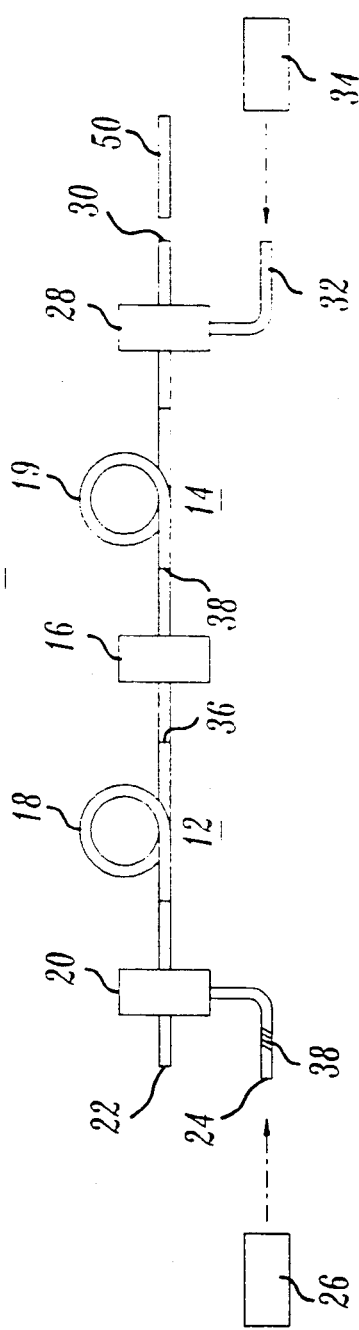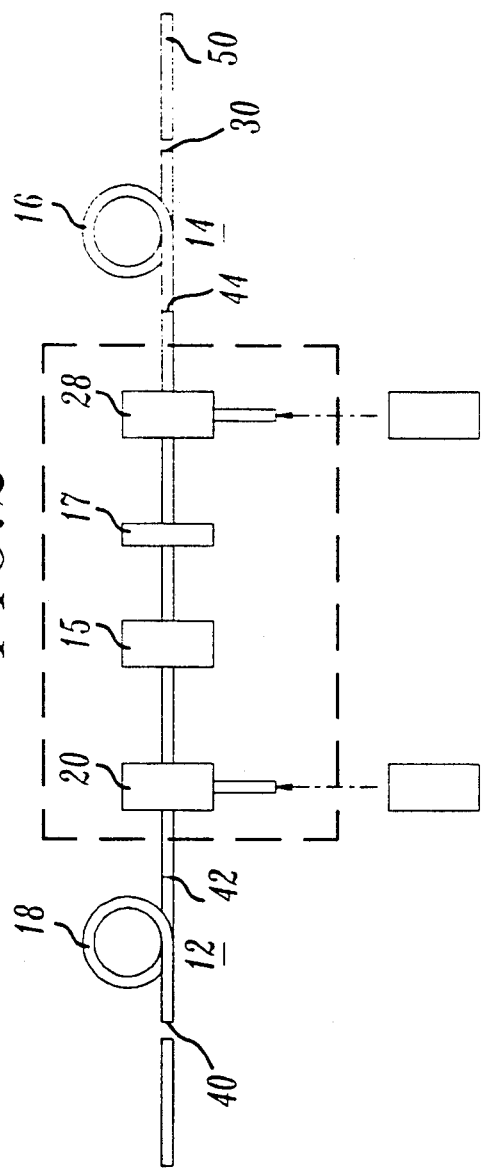

MULTI-STAGE OPTICAL AMPLIFIER

This application is a continuation of application Ser. No. 07/530,665, filed on May 30, 1990 now abandoned.

TECHNICAL FIELD

This invention relates generally to optical amplifiers for lightwave communications and more particularly to an Erbium-doped optical fiber amplifier having more than a single stage of amplification.

BACKGROUND OF THE INVENTION

There is considerable interest in using rate earth doped fiber amplifiers to amplify weak optical signals for both local and trunk optical telecommunications networks. The rare earth doped optical amplifying fibers are found to be low in cost, exhibit low-noise, have a relatively large gain bandwidth which is not polarization dependent, exhibit substantially reduced crosstalk problems and display low insertion losses at the relevant operating wavelengths, for example, approximately 1.55 $\mu$m which are used in optical communications. A rare earth doped optical fiber amplifier can be coupled end-to-end to a transmission fiber and a laser diode pump, through an optical multiplexer. The optical multiplexer is designed to combine the signal which is to be amplified and the output from the laser diode pump with low loss. When the amplifying medium is excited with the optical power from the pump laser, signal light traversing the amplifier experiences gain. The pump energy may be made to propagate either co-directionally or contra-directionally relative to the signal energy, the direction of travel of the signal from the pump depending upon the noise requirements of the amplifier and whether any remaining unconverted pump light can be more conveniently filtered at the receiving end or transmitting end of the optical amplifier.

A complicating factor in the design of rare earth doped optical amplifiers involves the difference between the various parameters necessary to optimize the performance of the amplifier and those necessary to optimize the performance of the transmission system from end-to-end. In a transmission fiber, the spacing between repeaters, can be increased by minimizing loss in the fiber to reduce optical power requirements and by minimizing the fiber dispersion. However, in the amplifying fiber, as opposed to the transmission fiber, the major concern involves high gain, high saturation power and low noise, all with minimal pump powers. Additionally, because the signal mode size between the two fibers can be significantly different, splicing losses due to mode mismatch of the two fibers might be significant.

Currently, Erbium-doped fiber amplifiers appear to have the greatest potential for the high amplification necessary to overcome losses in the signal path including those of the various optical elements associated with the optical amplifier. Erbium-doped fiber amplifiers operate at $\lambda = 1.53-1.56$ $\mu$m which is of particular interest for optical communication systems because, in this wavelength region, the amplifiers exhibit low insertion loss, broad gain bandwidth (approximately 30 nm) and polarization insensitive gain. Such amplifiers, for example, when pumped at $\lambda = 1.48$ $\mu$m can have a gain as high as 35 dB but require as much as 70 mW of launched pump power. A higher gain together with a lower value of pump power is preferred.

SUMMARY OF THE INVENTION

This invention relates to an Erbium-doped fiber amplifier having multiple stages of amplification for providing enhanced performance. More specifically, optical means is located intermediate first and second stages of doped optical amplifying fibers adapted to receive a pump signal at a pump wavelength where the optical means is adapted to modify the net gain characteristics of the multi-stage amplifier. Presently, all known Erbium-doped fiber amplifiers utilize relatively simple single stage amplifiers which support required ancillary optically passive components such as isolators, filters, pump multiplexers, power monitors and the like at either end of the amplifier. This requirement of having the passive optical element at an end of the optical amplifier not only lends to relatively stringent design and fabrication tolerances for a high performance optical amplifier, but it restricts the design of the Erbium-doped fiber amplifier to an embodiment which prevents exploitation of the various unique properties of the Erbium-doped fiber amplifier.

BRIEF DESCRIPTION OF THE DRAWING

FIG. 1 is a block diagram of an Erbium-doped fiber amplifier having at least two stages of amplification in accordance with the principles of the invention;

FIG. 2 is a block diagram of another embodiment of structure in accordance with the principles of the invention.

In the various FIGS. of the drawing, similar parts have similar reference numerals.

DETAILED DESCRIPTION

Figure 3:
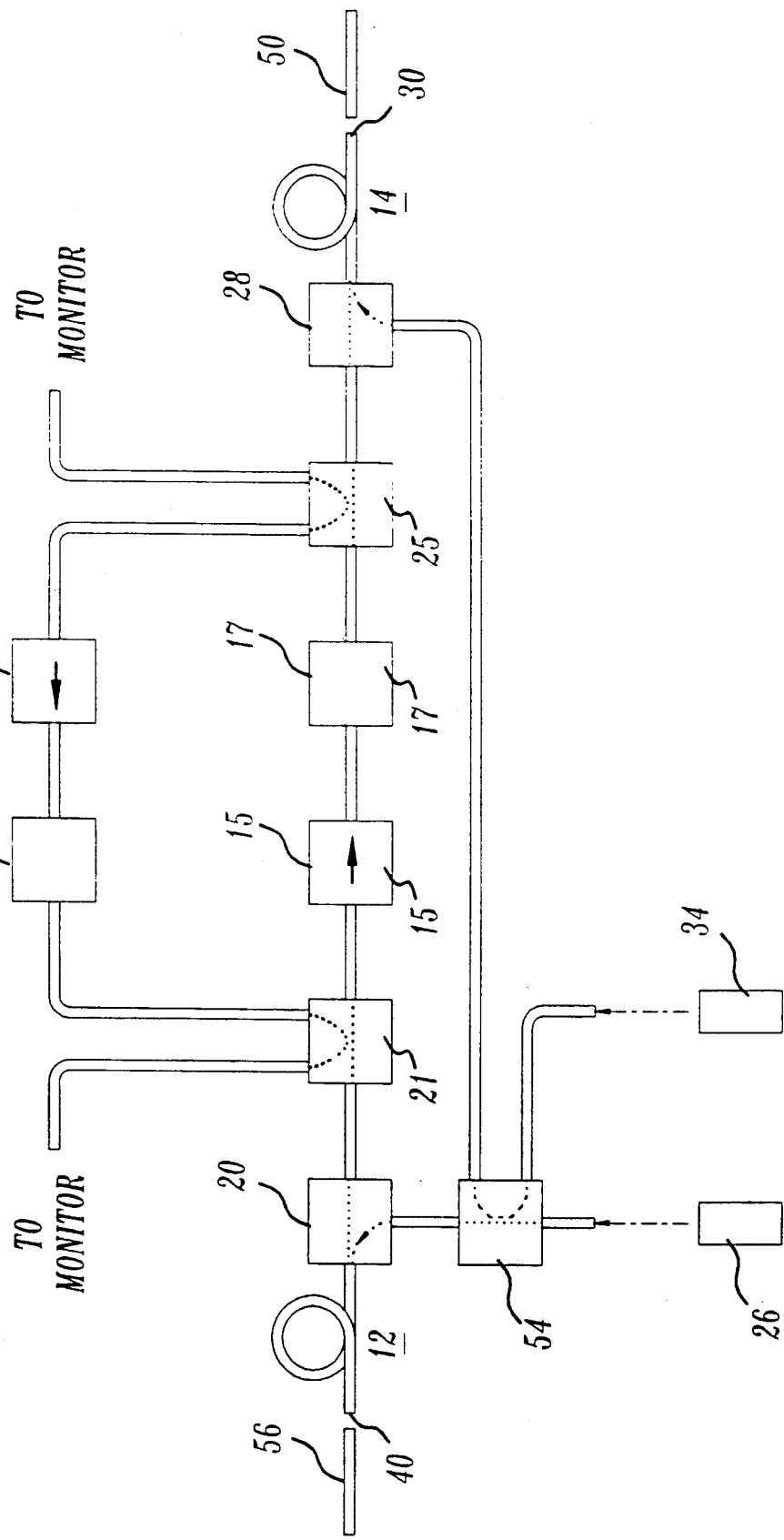
FIG. 3 is a block diagram of still another embodiment of structure in accordance with the principles of the invention.

Rare earth doped fibers for amplifying weak signals for both local and trunk optical telecommunications networks are of particular interest because of their low insertion loss, broad gain bandwidth and polarization insensitive gain. In use, the doped optical fiber is normally transversely coupled to a pump so that a weak optical input signal at some wavelength within the rare earth gain profile experiences a desired amplification. Pump light which can be coupled into the optical fiber via a directional coupler may propagate either co-directionally or contra-directionally within the fiber relative to the signal. The directional coupler can have a high coupling ratio at the pump wavelength and a low coupling ratio at the signal wavelength.

Erbium-doped optical amplifiers when used as power amplifiers, repeaters and preamplifiers in lightwave systems have been responsible for significant improvement in the performance of long-distance transmission systems, networks, CATV distribution and the like. Important features of these amplifiers include high gain ($>40$ dB), low noise (near quantum limit) and high saturated output power ($>10$ dBm). At the present time, all optical systems utilize relatively simple single-stage amplifiers in combination with ancillary passive components such as isolators, pump multiplexers, and power monitors which are attached to either end of the fiber amplifier. This arrangement not only leads to rather stringent design and fabrication tolerances for a high-performance optical amplifier, but it prevents the exploitation of several unique properties of Erbium-doped fiber amplifiers.

Following the teaching of this invention, enhanced performance of Erbium-doped fiber amplifiers is obtained when an optical fiber amplifier comprises multiple stages of amplification. Referring to FIG. 1, there is illustrated a multi-stage optical amplifier in accordance with the principles of the invention. The optical amplifier 10 comprises two separate and distinct stages of amplification separated by an optical means which can be a passive optical element such as an optical isolator. The first stage of amplification 12 is coupled to a second stage of amplification 14 through an optical means such as a passive element 16 which can be an optical isolator, an optical filter or the like. The first stage 12 can comprise a doped amplifying fiber 18 coupled via a coupler 20 to both an input port 22 for receiving a signal which is to be amplified and to a pump port 24 for receiving energy from a laser diode pump 26. Coupler 20 can be a multiplex (demultiplex) type of filter or an optical interference filter manufactured by, for example, JDS Optics of Ottawa, Canada.

The second stage 14 of the multi-stage amplifier can comprise a second doped amplifying fiber 14 coupled via a coupler 28 to both an output port 30 for providing a signal which has been amplified and to a pump port 32 for receiving energy from a laser diode pump 34. Similar to the first stage, coupler 28 can be a multiplex (demultiplex) type of filter or an optical interference filter manufactured by, for example, JDS Optics, a company located in Ottawa, Canada.

The output port 36 of the fiber 18 is coupled to the input port 38 of the fiber 19 via a passive optical element 16. The optical element 16 can be an optical isolator or an optical filter or both. The optical isolator can take the form of an optical diode which permits optical energy to travel from the first stage 12 to the second stage 14 but restricts the travel of optical energy in the opposite direction. The optical filter can take the form of a multiplexer which can be made from a, a diffraction grating, a thin film, or a filter which can restrict the amplified spontaneous emission (ASE) and/or has filtering characteristics for modifying the gain characteristics of the multi-stage amplifier or other type of filter which reduces energy in the form of spontaneous emission from flowing between the two stages and causing saturation of either stage. The optical isolator and or the optical filter can be coupled to the optical fibers of the first stage 12 and the second stage 14 either optically, by fusion, by splicing or by other means.

Light from laser diode pump 26 can be launched into the first stage 18 via a lens located at the pump port 24. A filter such as a holographic grating 39 can be formed in the fiber between the end 24 and the coupler 20 to reject an undesired mode from the laser diode pump by providing the required backscattering.

As noted above, the coupler 20 is constructed to couple both the input signal received by input port 22 and the pump signal received by pump port 24 to amplifying fiber 18. In a similar manner, coupler 28 is constructed to pass the amplified signal from the multi-stage amplifier to the output port 30 and to couple the pump signal received by pump port 32 to amplifying fiber 14.

The laser diode pump 34 described above can generate a primary signal having a wavelength of 1.48 μm. It is to be noted, however, that the diode pump which generates a signal having a wavelength of 0.98 μm can also be used. When a laser diode pump which generates a signal having a wavelength of 0.98 μm is used, the problems associated with having undesired modes in the 1.50–1.55 μm wavelength are not normally present.

In operation, an optical signal which is to be amplified is coupled by some convenient means such as, for example, optically or the like to input port 22 and a pump signal is coupled to pump port 24 and pump port 32. The received optical signal amplified by the Erbium-doped fiber amplifier 18 of the first stage 12 of the optical fiber amplifier 10 is coupled to the input port of the second stage 14 of the optical amplifier 10 via a passive optical element.

It is to be understood that the Erbium-doped fiber amplifier 18 of the first stage 12 can be pumped from either or both ends and that the Erbium-doped fiber amplifier 19 of the second stage 14 can also be pumped from either or both ends. This being so, the laser diode and a multiplexer for pumping the first and second stages 12, 14 of the optical amplifier 10 can be fabricated on a single substrate and, that substrate can include the passive optical element or elements such as an optical isolator and/or an optical filter.

By providing an optical amplifier which has two stages of amplification rather than only one, an Erbium-doped fiber amplifier is obtained which provides enhanced performance. For example, a multi-stage Erbium-doped optical amplifier has been built which had a 1 nm bandwidth with 46.4 dB fiber-to-fiber gain at 1533 nm, >7 dBm output power at 3 dB gain saturation and $n_{sp}=3.25$. The total pump power into the amplifier was less than 50 mW from two 1480 nm pump laser diodes. The positioning of one or more optical filters between the first and second stages of the multi-stage optical amplifier permits the gain spectrum to be controlled without significantly increasing amplifier noise as occurs when filters are placed at the input of a single stage amplifier or loss of saturated output power when the filters are placed at the output of a single stage amplifier. By positioning the filters between stages, not only are these deleterious effects avoided, but self saturation by ASE is greatly reduced. Thus, with this invention there is an increase of the efficiency of the conversion of pump light into signal photons. Additionally, by placing an optical isolator between two stages of a multi-stage Erbium-doped fiber amplifier rather than at an end, the multi-stage amplifier becomes more robust than an equivalent single stage amplifier. For example, the multi-stage amplifier becomes less sensitive to transmission fiber reflections or internal reflections that cause oscillations or undesirable noise. Furthermore, in many applications, a two-stage amplifier requires only one isolator whereas a single stage amplifier requires two isolators.

Another important advantage of the disclosed multi-stage optical amplifier is that very good conversion of pump light into signal light can be obtained to provide very high gain. Additionally, in the invention disclosed, the first stage can be operated as a low noise front end amplifier stage and the second stage can be operated as the power stage. This embodiment permits the second stage to be operated with a slightly higher noise to signal ratio without materially degrading the signal.

Referring to FIG. 2, there is illustrated another embodiment of structure in accordance with the principles of the invention. In the embodiment of FIG. 2 the couplers for coupling the laser diode pumps and the passive optical elements such as the optical isolator and/or optical filter are located between the first stage of amplification and the second stage of amplification. With this arrangement, the laser diode pump, couplers and passive optical elements can be on a single chip which can be conveniently located. In FIG. 2, an input port 40 of the first stage 12 of the multi-stage amplifier can be coupled either optically or by splicing, to a transmission fiber to receive an optical signal which is to be amplified. The output port 42 of the first stage 12 is coupled to coupler 20 either optically or by splicing. Coupler 20 couples a pump signal from a laser diode to the amplifying fiber 18 and also couples the amplified signal from the first amplifier stage 12 to an optical isolator 15. Isolator 15, which can be an optical diode, permits optical energy to travel from the first stage 12 to the second stage 14, but restricts the travel of optical energy in the opposite direction. The signal from the optical isolator can be connected to an optical filter 17 before passing through coupler 28 to the input port 44 of the second stage 14 of the multi-stage amplifier. The optical filter restricts energy in the form of spontaneous emission from the first stage 12 from reaching and causing saturation of the second stage 14 of amplification. Coupler 28 couples a pump signal from a laser diode to amplifying fiber 19 and also couples the amplified signal passed by isolator 15 and filter 17 to the input port of the second stage 14 of the multi-stage amplifier. The output port 30 of the multi-stage amplifier can be coupled, either optically, by splicing or the like to a transmission fiber 50. Couplers 20, 28, the isolator 15, filter 17 and laser diode pumps are positioned within a dashed box to indicate that they can be part of a common chip.

Referring to FIG. 3, there is illustrated still another embodiment of structure in accordance with the principles of the invention for amplifying two discrete signals which are being transmitted in opposite directions. In FIG. 3, an amplified signal which is to be amplified is coupled to the input port 40 of the first stage 12 of the multi-stage amplifier 10. Coupler 20 couples a pump signal from a laser diode pump to amplifying fiber 18 and couples the amplified signal from the first stage 12 to a coupler 21. The amplified signal from the first stage 12 received by coupler 21 is directed to optical isolator 15. As in FIG. 2, isolator 15 permits optical energy to travel from the first stage 12 to the second stage 14, but restricts optical energy from traveling in the opposite direction. The signal from the optical isolator 15 is directed through optical filter 17, optical coupler 25 which can be similar to optical coupler 21, and optical coupler 28 which can be similar to optical coupler 20. Coupler 28 couples a pump signal from a laser diode pump and the amplified signal from the first stage 12 to the input port of amplifying fiber 19. An optical isolator 52 in tandem with an optical filter 54 is coupled between optical filters 21, 25.

In operation, a first optical signal of a first wavelength which is received at port 40 of stage 12 of multistage amplifier 10 is first amplified in stage 12, then passes through couplers 20, 21, isolator 15, filter 17, coupler 25, coupler 28 and stage 14 where it is again amplified before arriving at port 30 for transmission along transmission fiber 50. A second optical signal of a second wavelength which is received at port 30 of stage 14 of multistage amplifier 10 is first amplified in stage 14. The amplified signal then passes through couplers 28, 25, isolator 52, filter 54, couplers 21 and 20 and stage 12 where it is again amplified before arriving at port 40 for transmission along transmission fiber 56.

In FIG. 3, optical filter 17 is designed to pass the amplified signal received from stage 12 and to block the amplified signal received from stage 14. Similarly, optical filter 52 is designed to pass the amplified signal received from stage 14 and to block the amplified signal received from stage 12.

Couplers 21 and 25 can be dichroic couplers, 3 dB couplers or other type of couplers. Thus, substantially 50% of the signal from stage 12 is passed through coupler 21 to isolator 15 and the remaining signal is passed through to filter 54 and isolator 52 where it is blocked. In a similar manner, substantially 50% of the signal from stage 14 is passed through coupler 25 to isolator 52 and the remaining signal is passed through to filter 17 where it is blocked.

Pump energy for stage 12 is obtained from laser diode 26 coupled to coupler 20; and, pump energy for stage 14 is obtained from laser diode 34 coupled to coupler 28. Locating a coupler 58, which can be a 3 dB coupler, between the laser diodes 26, 34 and the couplers 20, 28 permits the laser diodes to provide pump power to each stage either simultaneously, sequentially or alternately.

In some instances, a need may exist to monitor the operation of the multi-stage amplifier. Referring to FIG. 3, signals obtained from couplers 21 and 25 can be used to monitor the operation of the stages of the multi-stage amplifier 10.

An advantage of the embodiment of FIG. 3 is low input loss and high output saturation power and gain for signals being transmitted in two directions.

We claim:
1. A multi-stage optical amplifier comprising a first stage of amplification comprising an Erbium-doped optical amplifying fiber having a first port and a second port and lacking an isolator, a second stage of amplification comprising an Erbium-doped optical amplifying fiber having a first port and a second port and lacking an isolator,
- a first coupler coupled to the second port of said first stage of amplification,
- a second coupler coupled to the first port of said second stage of amplification,
- means for generating a pump signal at a pump wavelength coupled to said first stage of amplification through said first coupler and to said second stage of amplification through said second coupler,
- a third coupler interposed between said first coupler and said second coupler,
- a fourth coupler interposed between said third coupler and said second coupler,
- a first optical isolator and a first optical filter interposed between said third and fourth couplers to pass a signal of a first wavelength from first stage of amplification to said second stage of amplification, and
- a second optical isolator and a second optical filter interposed between said third and fourth couplers to pass a signal of a second wavelength from said second stage of amplification to said first stage of amplification.

2. The multi-stage optical amplifier of claim 1 wherein said third and fourth couplers comprises 3 dB couplers, said first and second optical isolators comprise optical diodes, said first and second optical filters comprise interference filters, and said means for generating a pump signal comprises a laser diode.

* * * * *